United States Patent [19]
Korman

[11] Patent Number: 6,119,689
[45] Date of Patent: Sep. 19, 2000

[54] PERSONAL AIR FILTERING AND DELIVERY SYSTEMS

[76] Inventor: David J. Korman, 625 Whitney Ranch Rd. #1413, Henderson, Nev. 89014

[21] Appl. No.: 09/025,222

[22] Filed: Feb. 18, 1998

Related U.S. Application Data

[60] Provisional application No. 60/038,842, Feb. 18, 1997.

[51] Int. Cl.[7] ............................................ A62B 7/10
[52] U.S. Cl. ........................ 128/205.29; 128/205.12; 128/205.27; 454/187
[58] Field of Search ..................... 454/187; 128/206.17, 128/205.27, 204.27, 205.29; 55/472; 135/93

[56] References Cited

U.S. PATENT DOCUMENTS

| | | | |
|---|---|---|---|
| 1,974,828 | 9/1934 | Markut | 454/364 |
| 3,505,989 | 4/1970 | Truhan | 128/1 |
| 3,606,589 | 9/1971 | Cameto et al. | 417/360 |
| 3,724,172 | 4/1973 | Wood | 55/97 |
| 3,736,927 | 6/1973 | Misaqi | 128/145.6 |
| 3,820,536 | 6/1974 | Anspach, Jr. et al. | 128/132 |
| 3,893,458 | 7/1975 | Fletcher et al. | 128/145.8 |
| 3,908,649 | 9/1975 | Eckstein | 128/147 |
| 3,954,429 | 5/1976 | van der Waaij | 55/279 |
| 4,019,508 | 4/1977 | Der Estephanian et al. | 128/142.7 |
| 4,191,543 | 3/1980 | Peters | 55/279 |
| 4,320,755 | 3/1982 | Flint et al. | 128/205.12 |
| 4,360,018 | 11/1982 | Choksi | 128/205.12 |
| 4,478,216 | 10/1984 | Dukowski | 128/204.21 |
| 4,602,646 | 7/1986 | Cascalenda et al. | 131/329 |
| 4,804,392 | 2/1989 | Spengler | 454/364 |
| 4,810,269 | 3/1989 | Stackhouse et al. | 55/267 |
| 4,872,397 | 10/1989 | Demeter et al. | 98/31.6 |
| 5,009,225 | 4/1991 | Vrabel | 128/201.24 |
| 5,022,900 | 6/1991 | Bar-Yona et al. | 55/316 |
| 5,054,479 | 10/1991 | Yelland et al. | 128/201.25 |
| 5,054,480 | 10/1991 | Bare et al. | 128/201.25 |
| 5,108,470 | 4/1992 | Pick | 55/126 |
| 5,193,347 | 3/1993 | Apisdorf | 62/3.7 |
| 5,195,922 | 3/1993 | Genco | 454/57 |
| 5,230,723 | 7/1993 | Travis et al. | 55/350 |
| 5,330,559 | 7/1994 | Cheney et al. | 95/63 |
| 5,419,953 | 5/1995 | Chapman | 428/284 |
| 5,423,779 | 6/1995 | Yeh | 604/317 |
| 5,453,049 | 9/1995 | Tillman, Jr. et al. | 454/228 |
| 5,474,599 | 12/1995 | Cheney et al. | 96/55 |
| 5,478,377 | 12/1995 | Scavnicky et al. | 96/17 |
| 5,484,472 | 1/1996 | Weinberg | 96/26 |
| 5,507,847 | 4/1996 | George et al. | 55/486 |
| 5,640,952 | 6/1997 | Swann et al. | 128/206.17 |
| 5,641,343 | 6/1997 | Frey | 96/135 |
| 5,651,810 | 7/1997 | Flaherty et al. | 95/287 |
| 5,667,564 | 9/1997 | Weinberg | 96/58 |
| 5,669,949 | 9/1997 | Dudrey et al. | 55/486 |
| 5,761,908 | 6/1998 | Oas et al. | 62/3.2 |

*Primary Examiner*—Harold Joyce
*Assistant Examiner*—Derek S. Boles
*Attorney, Agent, or Firm*—Mallinckrodt & Mallinckrodt

[57] ABSTRACT

An air filter unit includes an air filter made up of two layers of submicron filter media (32, 34) such as HEPA or ULPA filter media, with a layer of electrostatic filter media (33) sandwiched therebetween. Preferably, a layer of electrostatic filter media (31) is also provided on the upstream side of the submicron filter media (32). A personal delivery system for filtered air includes air delivery tubes (66) supported in relation to a user's face to position end air supply openings (67) adjacent opposite sides of the user's nose and mouth. Filtered air from the air supply tubes create a curtain or area of filtered air around the user's nose and mouth so the user breathes filtered rather than ambient air. An area delivery system includes a canopy (87) over the area with filtered air supplied to the inside of the canopy.

26 Claims, 3 Drawing Sheets

PERSONAL AIR FILTERING AND DELIVERY SYSTEMS

RELATED APPLICATION

This application claims the benefit of U.S. Provisional Application No. 60/038,842, filed Feb. 18, 1997.

BACKGROUND OF THE INVENTION

1. Field

The invention is in the field of air filtration systems, particularly personal air filtration systems which filter air and supply such filtered air to one, or several, individuals or to an area occupied by one, or several, individuals. It is also in the field of supplying filtered air to an individual or area occupied by an individual.

2. State of the Art

Air pollution, whether pollution of outdoor atmospheric air naturally with dust, pollens, or other natural pollutants or with pollutants introduced by man or machines, or indoor pollution such as dust, germs, bacteria, etc. which enter the air inside a room or other closed area and may be distributed throughout the room or area, or throughout a whole building by the building heating or air conditioning system, is a major problem with significant health risks. While environmental concerns dictate reduction of some of the source of man-made pollution, serious pollution remains.

Various types of air filtering units designed to remove various types of pollutants have been suggested. Room air filter units, such as shown in U.S. Pat. No. 5,453,049, draw in room air, filter it, and then discharge the filtered air back into the room. However, while some benefit may be obtained with such units as pollutants in the room may be reduced, the air in the room remains polluted and persons in the room are breathing the mixed, polluted air.

Systems have also been suggested, such as by U.S. Pat. No. 4,872,397, for providing a personal indoor environment in a person's individual work area. In addition to individually controlled heating and cooling, the air entering such area may also be filtered. Again, however, this air is generally mixed with ambient air around the work area so the air in the work area is actually a mixture of filtered and polluted ambient air.

Large filtering units may be used to provide a clean environment in "clean rooms". However, the use of "clean rooms" is generally required for particular manufacturing processes, such as in semiconductor manufacturing, and is not provided for the benefit of occupants of the rooms. Thus, clean rooms are provided only when necessary for particular manufacturing processes and are not generally provided to keep people from polluted air.

Various personal air filtration devices have been disclosed. U.S. Pat. No. 5,667,564 shows a small device which filters and ionizes air which flows from one end of the device. Presumably, the device is worn by a user who directs the purified air toward the user's face. U.S. Pat. Nos. 5,054,479 and 5,054,480 each disclose headgear having a face covering shield and the supplying of filtered air to the area between the face and shield so that the user is supplied with filtered air for breathing. However, such devices require wearing of the face shield in order to get the purified air.

SUMMARY OF THE INVENTION

According to the invention, air from a personalized air filtration system, which may utilize a special filter arrangement, may be delivered to a user by one or more air supply tubes positioned adjacent the user's nose and mouth so that filtered air is directed to the area of the user's nose and mouth to the substantial exclusion of ambient atmospheric air. The tubes may be supported by various types of headgear such as a headband or visor, and may be supported similarly to a microphone used for hands-free telephone communication. It is presently preferred to have two air supply tubes which are positioned on opposite sides of the user's nose and mouth each directing filtered air toward the other. This eliminates the need for a hood or helmet with a visor over the face.

Where the user is in a confined space, such as when sleeping, when confined to bed as in a hospital, or at a workstation, a canopy may be used to partially enclose the space and the filtered air is supplied to fill the canopy and keep out ambient atmospheric air.

The air supply unit preferably has a special filter arrangement with electrostatic filter media sandwiched between submicron filter media. The submicron filter media may be HEPA (high efficiency particulate air) or ULPA (ultra low penetration air) filter media. By sandwiching the electrostatic filter media between the submicron filter media, the static charge is maintained and enhanced in the electrostatic media, and any larger particles that make it through the first layer of submicron filter media are either trapped by the electrostatic media before reaching the second layer of submicron media, or are slowed down to the extent that they are stopped by the second layer of submicron media. Preferably, to extend the life of the filter, one or more prefilters are provided to filter out large particles before they reach the filter.

The filter and prefilters are preferably easily removable so that they may be easily changed and various prefilters may be selectively used depending upon the situation.

THE DRAWINGS

The best mode presently contemplated for carrying out the invention is illustrated in the accompanying drawings, in which:

FIG. 1 is a perspective view of a filter unit of the invention;

FIG. 2, a vertical section taken on the line 2—2 of FIG. 1;

FIG. 2a, an enlarged fragmentary vertical section of the corner of the housing indicated by the lines 2a in FIG. 2;

FIG. 2b, an enlarged fragmentary vertical section similar to that of FIG. 2a, showing an alternate embodiment which includes a catalytic converter;

FIG. 3, a side view of a canopy delivery system of the invention showing the canopy positioned over a bed;

FIG. 4, a fragmentary vertical section taken on the line 4-4 of FIG. 3;

FIG. 5, a perspective view of a head mounted delivery system of the invention;

FIG. 6, an enlarged fragmentary side elevation of the pivotable air hose-headband connection;

FIG. 7, a fragmentary vertical section taken on the line 7—7 of FIG. 6; and

FIG. 8, an end elevation of the air outlet of the air tubes of FIG. 5.

DETAILED DESCRIPTION OF THE ILLUSTRATED EMBODIMENT

Figure 1:
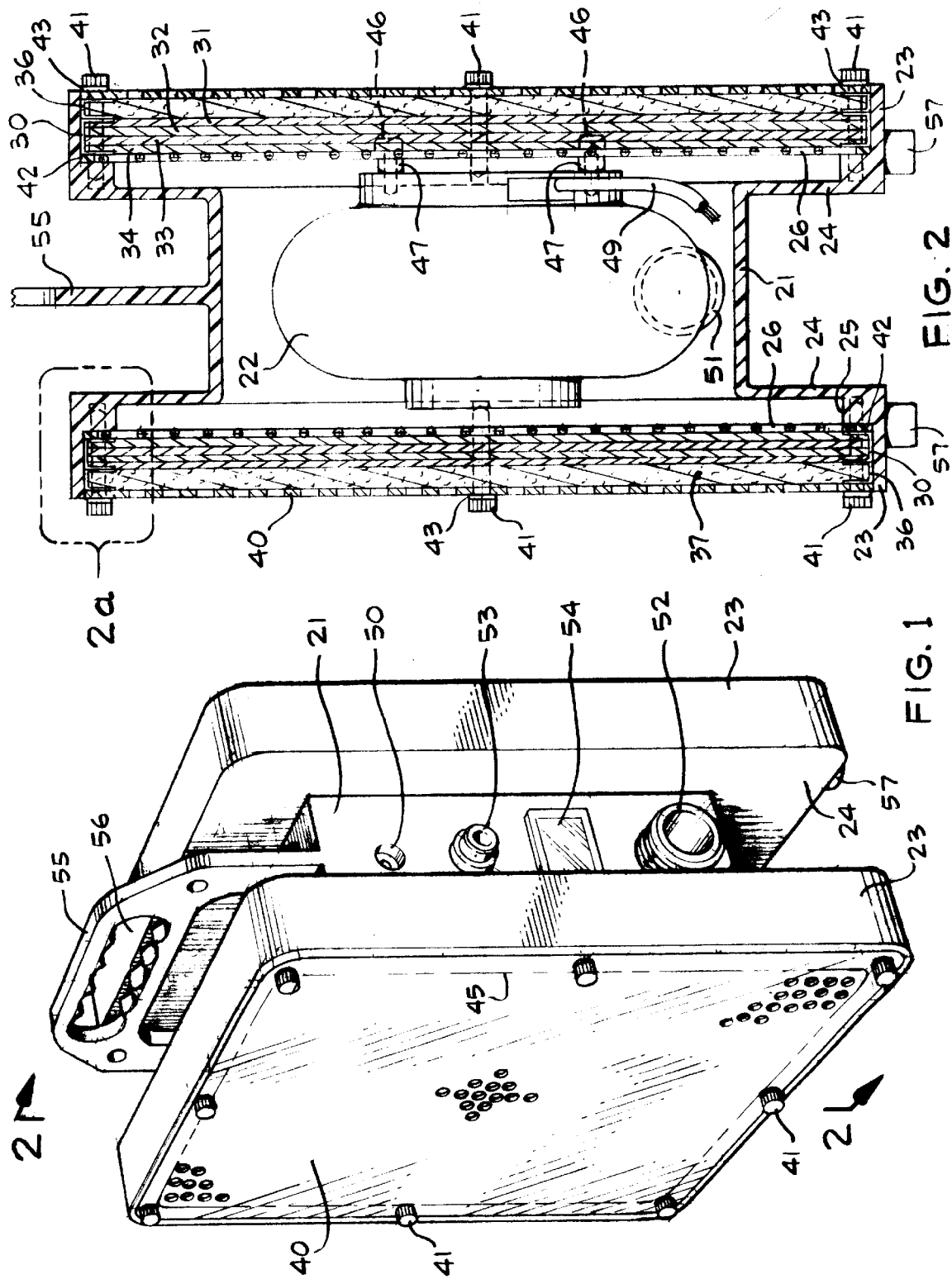

A presently preferred embodiment of a portable air filter unit is shown in FIGS. 1, 2, 2a, and 2b. The unit includes a housing having a central housing portion 21 sized to receive an air moving means such as an electrically operated blower 22 therein and larger, opposing filter receiving outer housing portions 23. Housing walls 24 form part of the outer housing and connect the outer housing portions to the central housing portion.

Filter and prefilter means are removably and replaceably positioned in each of the outer housing portions 23. A ledge 25 extends around the inside outer periphery of the outer housing portions to serve as a stop for respective screens 26 and for the filter and prefilter means, and to space screen 26 from housing walls 24. Respective filter means each include a peripheral channel 30 holding four layers 31, 32, 33, and 34 of filter media. It has been found that a very effective filter can be formed using a layer 31 of electrostatic filter media, a layer 32 of submicron filter media such as HEPA (high efficiency particulate air) filter media or ULPA (ultra low penetration air) filter media followed by another layer 33 of electrostatic filter media followed by another layer 34 of either HEPA or ULPA filter media. The HEPA filter media is generally capable of filtering out over 99.99 percent of particles over 0.3 microns in size while the ULPA filter media is generally capable of filtering out over 99.99 percent of particles over 0.1 microns in size. Such media is available commercially from a number of sources such as from EFCO in Ventura, Calif.

Normally air filters using HEPA or ULPA media use a single layer of such media and often pleat such media so as to increase the surface area of media through which air can be drawn. However, if larger particles hit such media with enough energy, they can sometimes penetrate through the media and are not filtered out as they should be. It has been found that when two layers of the HEPA or ULPA media are used, particles which might penetrate the first layer will generally be stopped by the second layer. However, by sandwiching a layer of electrostatic filter media between the layers of HEPA or ULPA media, any larger particles that penetrate the first layer of submicron filter media are generally stopped or at least slowed down sufficiently so they do not reach the second layer of submicron media or are effectively stopped by such second layer. With a layer of electrostatic filter media placed before the first layer of submicron filter media, most particles that might penetrate the first layer are stopped or sufficiently slowed down so they do not travel beyond the first layer of submicron media. It has been further found that such layering of the electrostatic media between the submicron media better maintains the electrostatic charge on the electrostatic media. The additional layer of electrostatic material also helps with this.

While various electrostatic media is available, a non-woven polypropylene electrostatic filter media from EFCO in Ventura, Calif., works well. With the layered filter construction illustrated and described, the air flow through the filter can be increased over what would normally be used with a single layer of HEPA or ULPA filter media and still maintain the rated filter efficiency of the HEPA or ULPA media. In addition, the layering of the media as described will extend the time over a single layer before the material becomes loaded to the extent that it needs to be replaced.

Since the time between changes of the filter depends upon the number of particles filtered out of the air passing through the filter, and because the filter may not filter out odors from the air, it is generally desirable to provide a prefilter. The prefilter is usually provided to efficiently filter out larger particles, normally those larger than about ten microns, and to filter out odors that might be present in the air. Thus, a prefilter includes a peripheral channel 36 holding prefilter media 37 which may be an activated carbon felt material which performs similarly to activated charcoal, but has increased surface area. Such filter media is also available from EFCO.

While the activated carbon prefilter is good for removing odors, various other prefilter materials may be used. For example, the electrostatic filter media described above may be used for a prefilter as well as part of the filter as described, for filtering larger particles. In particularly dusty conditions, such as for use on a tractor when plowing fields, a foam prefilter which is washable can be used to catch the dust. Combinations of various prefilter medias can be customized to particular uses.

The prefilter is positioned adjacent the filter in the outer filter receiving portion 23 of the housing. A screen or perforated grating form covers 40 positioned over the prefilter and secured to the outer portion of the housing by a plurality of screws 41 about the periphery of the cover. The screws are threaded into ledge 25 so that the filter and prefilter are tightly positioned in the housing. A gasket 42 seals the area around screen 26 to ensure that all air passing into the central portion of the housing has passed through the filter rather than passing around it. Gaskets 43 between the heads of screws 41 and cover 40 also help ensure this. The perforations in cover 40 preferably do not extend into the peripheral area of the cover outside of broken line 45.

The air moving means, shown as blower 22, may be conveniently held in position in the central portion of the housing by one of the screens 26 to which it is mounted by screws 46 and standoffs 47. The blower may be as sold by Amatec under the name MINI JAMMER and is designed to operate at twelve volts and up to five amperes to move up to about thirty to thirty-two cubic feet of air per minute. The MINI JAMMER unit includes an electronic voltage control to operate the motor at a desired speed for a desired air output. An electrical cord 49 extends from the blower unit for supply of electricity to the controller and motor. The cord extends to an electrical socket 50 on the outside of central housing portion 21. A user would plug a twelve volt supply cord into socket 5. Such cord could come from the common transformer and rectifier which plugs into a wall socket and supplies twelve volts DC for various uses. Alternatively, a battery could be provided in the unit to supply power to the motor. The blower unit 22 has an air outlet 51 which is connected to housing air outlet 52 extending from central housing portion 21. The housing air outlet 52 is externally threaded so that an air supply hose can be connected thereto. Various other arrangements and connection means could be used for the air outlet 52 on the unit. The unit also includes an on/off switch 53, which may be a lighted push button switch which lights when on, and a display 54. The display 54 may be a light emitting diode display or a liquid crystal display and can be used to indicate if the unit is on or off and to supply other information such as air flow rates, time to change filters, etc., as desired.

A handle 55 extends from the unit so that it can be easily carried and a closed handle opening 56 is provided so that the unit can be hung on hooks or other projections. The opening 56 is preferably sized so that, if desired, the unit can be positioned behind an automobile seat with the headrest support bars passing through the opening. For uses in an automobile, the unit would be connected to the automobile electrical system such as by a wire to the lighter. The unit could also be placed on the seat of an automobile and cold air from the air conditioner can be circulated toward the unit. Rubber feet 57 are provided on the side of the housing opposite the handle to protect a surface on which the housing is placed.

With the particular unit shown, satisfactory results for a personalized supply of fresh air can be obtained using filters of nine by nine inches in size and running the blower unit to provide about twenty-eight cubic feet of air per minute. This produces an air velocity through the filters of about twenty-one to twenty-two feet per minute. The four layer filters are about three-eights inch thick. The housing is just over nine inches by nine inches by about four and one-half inches. The unit weighs about three to four pounds.

Figure 2:
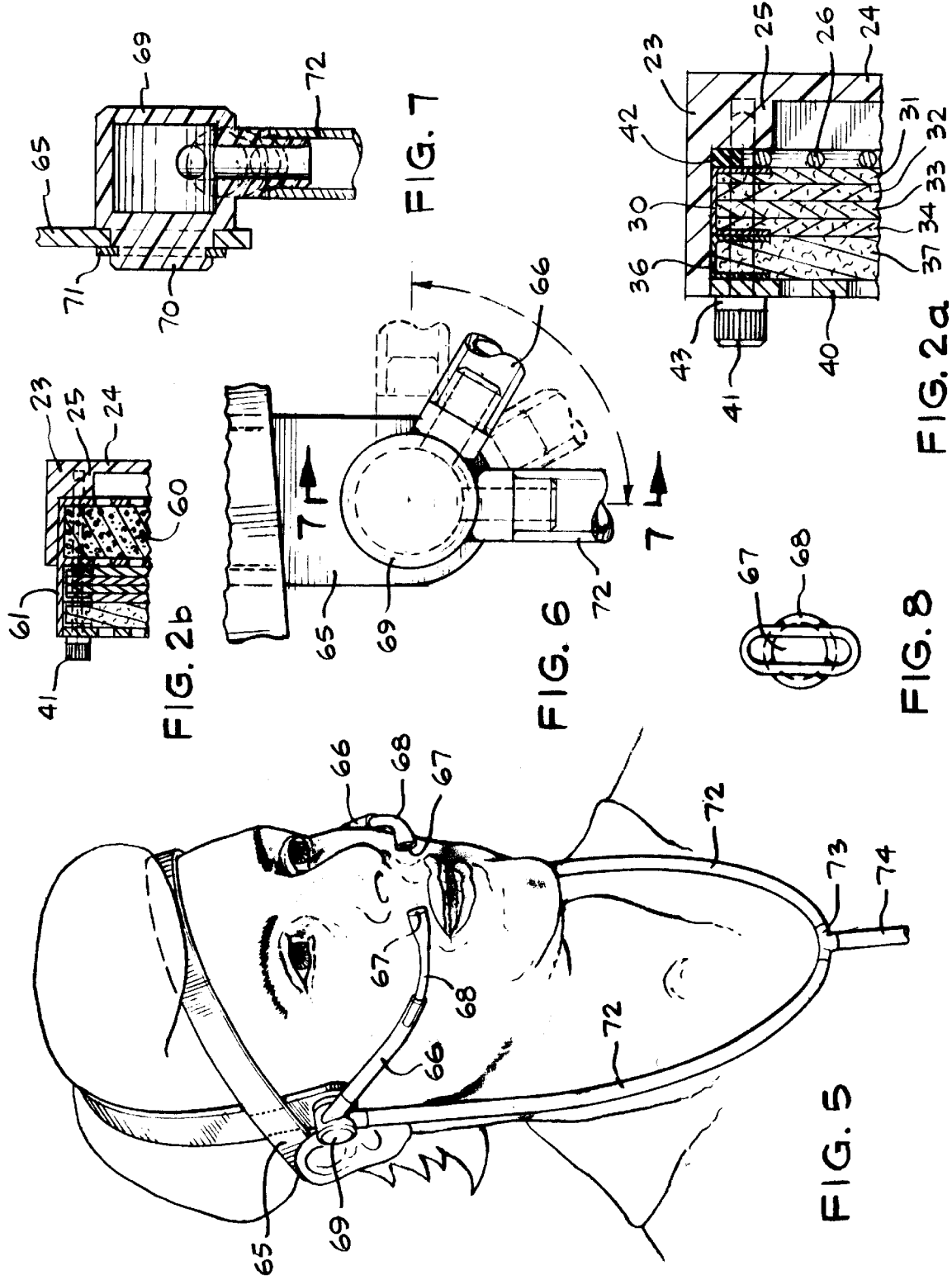

With the construction of the filter unit as shown and described, filters may be easily removed and replaced by removing cover 40, and the prefilter may be easily added and selected as desired. While one prefilter layer is shown, several could be used depending upon the situation. Also, if used in high ozone or carbon monoxide environments, a catalytic converter could be added to the unit. FIG. 2b shows a catalytic converter 60 positioned in outer housing portion 23 in place of the filters and prefilters. The catalytic converter 60 includes outwardly extending flanges 61 which form extensions of outer housing portions 23 and which then accept the filters and prefilters similarly to the way they were accepted in outer housing portions 23 as shown in FIG. 2. The catalytic converters would also be connected to the source of power to which the blower is connected because the catalytic converters include a heat source as heating is usually necessary. When the efficiency of the catalytic converter is reduced through use, the converters can be easily removed, similarly to the filters, and recharged by heating them in an oven at about 350 degrees F.

A personal air delivery system is shown in FIGS. 5–8. Headgear 65 is worn about the head of a user and pivotally supports air supply tubes 66 with air discharge ends 67 at the end of adjustable end pieces 68. The pivotal support is provided by plenum chambers 69 having a circular tab 70 extending through headgear 65 (see FIG. 7) with a snap ring 71 holding it in place on headgear 65 and providing sufficient resistance so that plenum 69 may be rotated as shown in FIG. 6 and maintain its rotated position. Air supply tubes 72 extend from plenum 69 to connector 73, from which air supply tube 74 extends to a source of filtered air such as the filtration unit of FIGS. 1 and 2. Thus, the end of air supply tube 74 not shown in FIG. 5 could extend to and connect the air outlet 52 of FIG. 1. In this way, air is supplied to and flows from the discharge ends 67 of end pieces 68 of air supply tubes 66. The ends 67 are preferably flattened as shown in FIGS. 5 and 8 to provide a ribbon of air flowing therefrom and are positioned, as shown, below a users eyes and adjacent a user's nose and mouth so as to supply filtered air in the area of the user's nose and mouth. This air, particularly when two opposing air supply tubes are used as shown in FIG. 5, creates a pocket of air, and if aimed at one another, a pressurized pocket of air, about the user's nose and mouth to keep out ambient air and provide the filtered air to the user's nose and mouth for breathing. When pressurized, more oxygen is available to the user than from the ambient air. Generally, the outlets can be positioned to supply air as an air curtain without blowing on the face of the user.

The position of the ends 67 of the air supply tubes is adjustable up and down by pivoting plenum 69 and the lateral positioning is adjustable by sliding end pieces 68 in or out in relation to tubes 66. End pieces 68 can also be rotated in relation to tubes 66.

While particular headgear 65 is illustrated in FIG. 5, various other types of headgear can be used such as a head or ear band, a visor, or a hat. Some variations of headgear are shown in the priority application. Further, if desired, the air supply tube could use an ear mount rather than headgear. In addition, the air supply tube could be supported in conjunction with earphones and, if desired, a microphone, as commonly used with personal music systems or personal communications systems.

Figure 3:
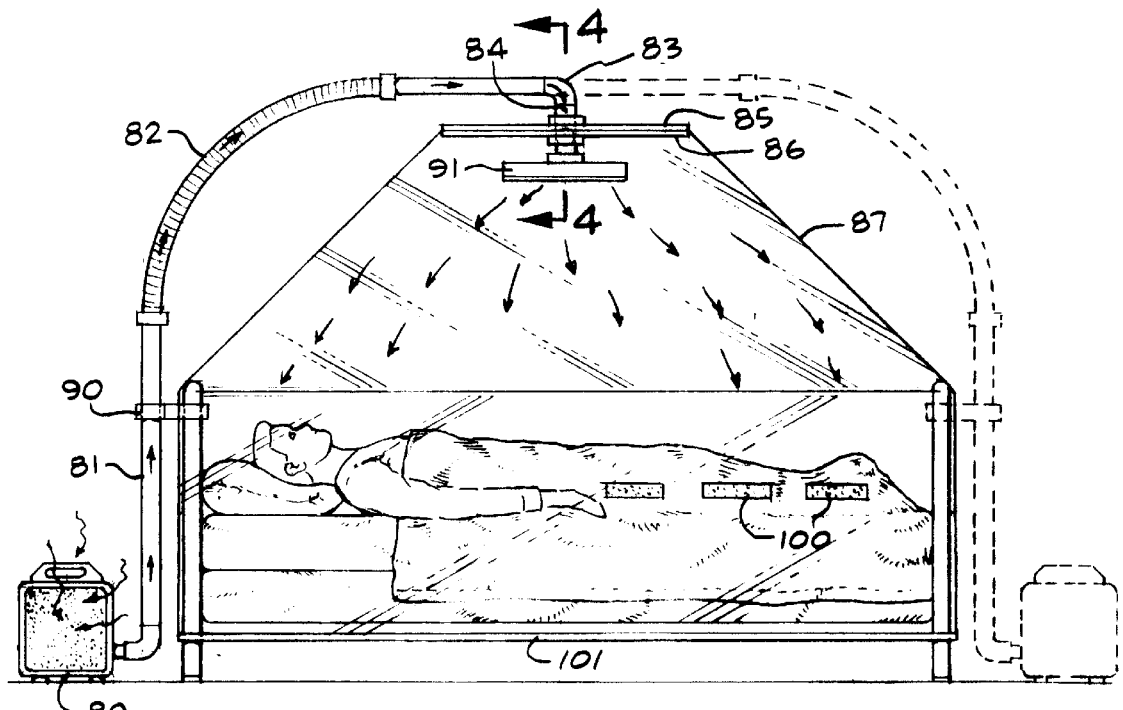
Figure 4:
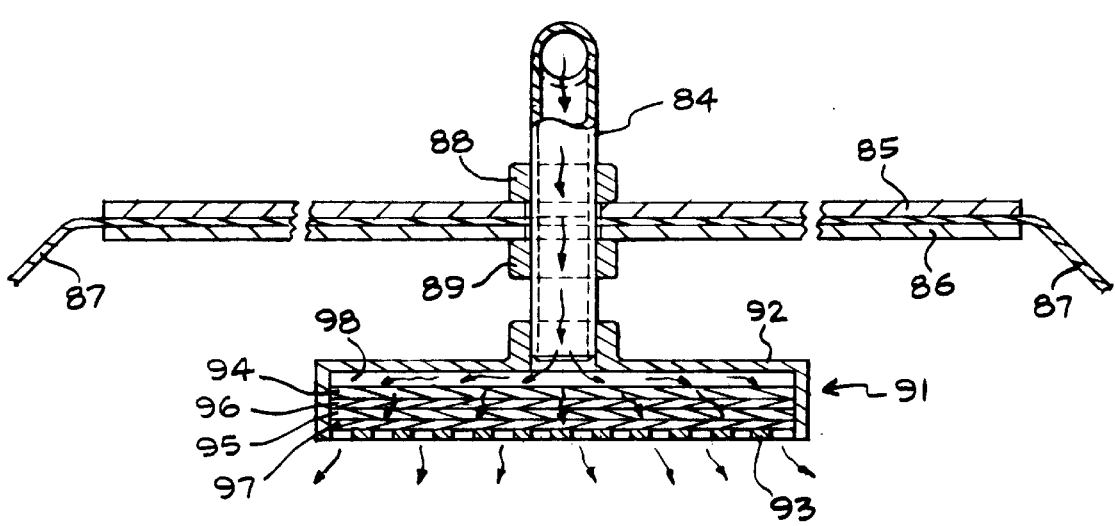

A personal area delivery system is shown in FIGS. 3 and 4. This delivery system involves the use of a canopy to enclose the area of filtered air. The delivery system shown using the canopy can be used in various situations such as over a bed, such as a hospital bed or a person's own bed at home, over a desk, over a workstation, or wherever a user would spend time in one place.

The delivery system is shown in FIGS. 3 and 4 in use with a bed, such as a hospital bed. Hospitals are known as having poor quality air because germs, bacteria, etc. are broadcast into the air by the various patients and other people in the hospital and are spread throughout the hospital by the air conditioning and heating system. Infection and disease is easily spread.

As shown in FIG. 3, an air supply unit 80 has an air supply tube 81 extending upwardly and laterally therefrom to support a canopy over a bed or work space. The central portion 82 of the air supply tube 81 is somewhat flexible so it can be bent into a desired configuration, as shown. Alternatively, an elbow or fixed curved portion could be provided in the air supply tube to extend the end of the tube laterally away from the air supply unit 80 to extend over the area to be supplied with filtered air. An elbow 83 toward the end of the air supply tube 81 away from the air supply unit 80 provides a substantially vertically oriented end portion 84, which may be threaded. While the canopy may be supported and attached to the end of the pipe 81 in various ways, it has been found satisfactory to provide a pair of disks 85 and 86 between which canopy material 87 is positioned. With end portion 84 threaded, upper collar 88 and lower collar 89 may each be screwed onto end portion 84 with disks 85 and 86 and canopy material 87 sandwiched between collars 88 and 89. This provides good support for the canopy and spreads canopy material 87 at the top of the canopy. The canopy material then extends downwardly to surround the bed or other work area. If desired, a clamp 90 may secure the air supply pipe 81 to the bed to stabilize the canopy.

Air can be discharged directly from the end portion 84 of pipe 81 into the interior of the canopy. This would be done where air supply unit 80 is as shown in FIGS. 1 and 2 with all air filters therein. If desired, unit 80 can be merely a prefilter unit. In that case air filter unit 91 can be secured to the end of end portion 84 such as by screwing such filter unit onto the end portion as shown. The filter unit 91 is similar to the filter as shown in FIGS. 1 and 2 and includes a circular housing 92 with an end perforated portion 93 secured, such as by gluing, thereto. Inside the unit are alternating layers of electrostatic filter media 94 and 95 and alternating layers of submicron filter media 96 and 97. An air space 98 is formed upstream of the first layer 94 so air can flow through the entire filter media area. This filter unit 91 may be easily replaced by merely unscrewing it and then screwing a new unit in place.

The canopy is preferably made of a diaphanous material such as a fifteen to thirty denier stocking fabric and is preferably between about fifteen to thirty percent porous. This provides a generally see-through canopy and allows air from inside the canopy to diffuse out of the canopy. Additional vents 100 can be provided to allow air to escape from the canopy. If desired, with the light canopy material described, weights 101 may be provided at the lower edges of the canopy material to hold it in place.

With filtered air being supplied to the inside of the canopy, the canopy is under positive pressure with respect to ambient air in the room so that fresh filtered air is supplied to the canopy. When used in a hospital, the canopy material may be treated with a bactericide or germicide to help prevent bacteria and germs of the person inside the canopy from escaping into the room outside of the canopy.

While the filter arrangement of the air filter unit shown in FIGS. 1, 2, 2a, and 2b is presently preferred, it should be realized that any air filter unit can be used with the personal delivery system of FIGS. 5–8 or with the area delivery system of FIGS. 4 and 5. Also, the filter arrangement disclosed could be used with other air filter units and other delivery systems as in room or large area filter systems.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. An air filtration system, comprising:

air moving means for drawing air into an air inlet and discharging air from an air outlet; and filter means through which the moving air passes, said filter means comprising a plurality of layers of submicron filter media alternating with and sandwiching at least one layer of electrostatic filter media.

2. An air filtration system according to claim 1, additionally including prefilter means upstream of the filter means.

3. An air filtration system according to claim 2, wherein the prefilter means is an activated carbon felt material.

4. An air filtration system according to claim 2, wherein the prefilter is a foam filter material.

5. An air filtration system according to claim 1, further comprising, a housing within which the air moving means is mounted along with the air inlet, and prefilter means removably secured to the housing so that air drawn into the air inlet is drawn through the prefilter means.

6. An air filtration system according to claim 5, wherein the prefilter means is made up of at least one prefilter media selectable by the user.

7. An air filtration system according to claim 5, wherein the prefilter means is contained in a removable and replaceable frame.

8. An air filtration system according to claim 7, wherein the filter means is removably secured to the housing between the prefilter means and the air inlet.

9. An air filtration system according to claim 8, wherein the filter means is contained in a removable and replaceable frame.

10. An air filtration system according to claim 1, wherein the filter means is mounted in association with the air outlet so that air discharged from the air outlet passes through the filter means.

11. An air filtration system according to claim 1, wherein the submicron filter media is HEPA filter media.

12. An air filtration system according to claim 1, wherein the submicron filter media is ULPA filter media.

13. An air filtration system according to claim 1, additionally including at least one air supply tube with an air discharge end, means supporting the at least one air supply tube so the air discharge end is below a user's eyes and adjacent a user's nose and mouth, and a connecting tube connecting the at least one air supply tube to the outlet so the air from the outlet is discharged adjacent the user's nose and mouth.

14. An air filtration system according to claim 13, wherein the means supporting the at least one air supply tube is a headpiece worn on the user's head which positions the air discharge end of the at least one air supply tube adjacent the user's nose and mouth.

15. An air filtration system according to claim 14, wherein the positioning of the discharge end of the air supply tube adjacent the user's nose and mouth is adjustable.

16. An air filtration system according to claim 13, wherein the at least one air supply tube is two air supply tubes positioned so that the discharge ends of the two air supply tubes are adjacent opposite sides of the user's nose and mouth.

17. An air filtration system according to claim 1, additionally including a canopy for partially surrounding a user, an air supply tube extending from the outlet to a position in the canopy to supply air from the outlet to the canopy, whereby the canopy collects the air from the air supply tube and concentrates it within the canopy.

18. An air filtration system according to claim 17, wherein the canopy is formed by a fabric material.

19. An air filtration system according to claim 18, wherein the fabric material is diaphanous and porous.

20. An air filtration system according to claim 19, wherein the filtering material is treated to be antibacterial.

21. A personal air delivery system for delivery of breathable air to a user whose nose and mouth are uncovered and thereby directly open to ambient air, comprising:

a pair of air supply tubes each having an air discharge end;

means worn on a user's head for supporting the air supply tubes on opposite sides of a user's head with their air discharge ends located adjacent opposite sides of a user's nose and mouth and directed generally toward one another so that air discharged from the air discharge ends of the tubes displaces the ambient air in the area of the user's nose and mouth so that the user breathes air discharged from the discharge ends of the tubes; and means connecting the air supply tubes to a source of pressurized breathable air.

22. An area air delivery system for delivery of breathable air to an area occupiable by a user who can enter and leave the area, comprising:

a canopy formed by porous fabric material for at least partially surrounding the area to which air is to be supplied and defining the area which a user can enter and leave;

an air supply tube having a discharge end positioned in the canopy; and means connecting the air supply tube to a source of pressurized breathable air whereby breathable air is supplied to and fills the area.

23. An area air delivery system according to claim 22, wherein the porosity of the fabric material is fifteen to thirty percent.

24. An area air delivery system according to claim 22, wherein the porous fabric material is treated with one or more of a bactericide and germicide.

25. A personal air delivery system according to claim 21, wherein the location of each air supply tube is independently adjustable.

26. A personal air delivery system according to claim 25, wherein the means for supporting the air supply tubes is headgear worn by the user; and including a pair of plenum chambers secured to the headgear on opposite sides of the head with one of the air supply tubes of the pair of air supply tubes extending from each of the plenum chambers.

* * * * *